Figure 1:
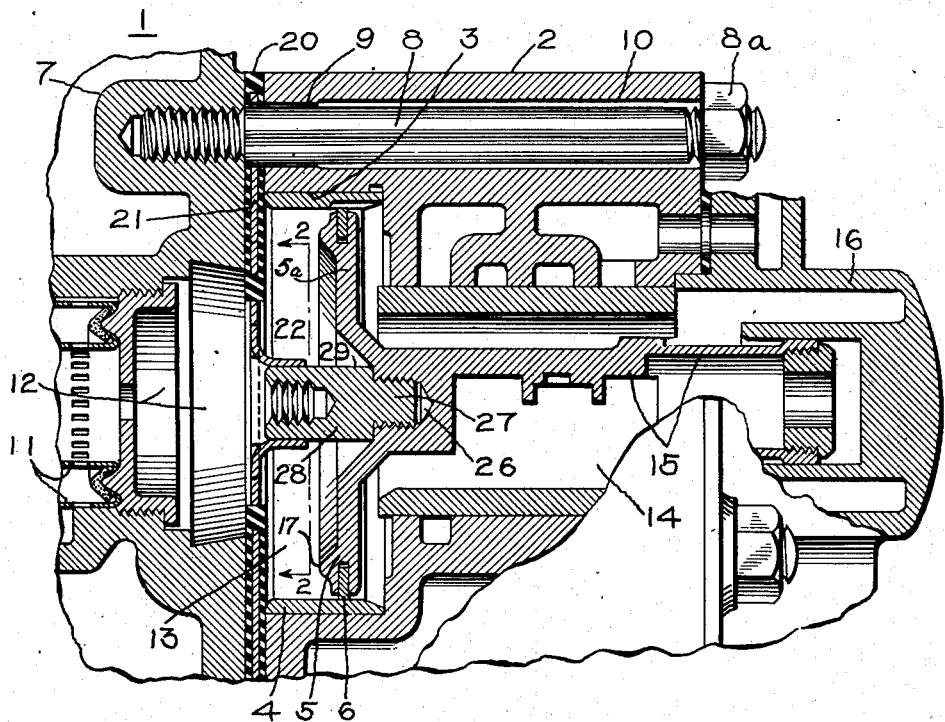

Nov. 28, 1944.    J. N. GOOD    2,363,584
VALVE DEVICE
Filed May 27, 1942    2 Sheets-Sheet 1

INVENTOR
John N. Good
BY
*A. M. Higgins*
ATTORNEY

Nov. 28, 1944.  J. N. GOOD  2,363,584

VALVE DEVICE

Filed May 27, 1942  2 Sheets-Sheet 2

INVENTOR
John N. Good
BY
ATTORNEY

Patented Nov. 28, 1944

2,363,584

UNITED STATES PATENT OFFICE 2,363,584

VALVE DEVICE

John N. Good, Wilmerding, Pa., assignor to The Westinghouse Air Brake Company, Wilmerding, Pa., a corporation of Pennsylvania Application May 27, 1942, Serial No. 444,667

12 Claims. (Cl. 303—1)

This invention relates to valve devices and more particularly to the type embodying a piston arranged to be moved by a differential between fluid pressures acting on its opposite sides.

In air brake devices such as employed on railway vehicles, pistons are employed for operation upon a change in air pressure in a control pipe and thereby on one side of the pistons to effect an application of the brakes on the vehicle, to release the brakes, or to accomplish other desired brake controlling operations. The pistons are arranged to reciprocate in bores and comprise piston heads of a diameter somewhat less than that of the bores, and the piston heads are therefore provided with ring grooves carrying rings which are expanded into contact with the wall of the bores to provide a leak tight seal between the piston heads and said walls.

Due to the fact that the diameter of a piston head such as above described is slightly less than that of the bore in which it operates, the piston head is capable of a certain degree of radial movement relative to the ring and to the wall of the piston bore. This relative movement is slight and resisted by friction between the ring and the side walls of the ring groove in the piston head. Nevertheless in a brake device applied to a railway vehicle, which at times is subject to severe vibration due for instance to the wheels striking uneven joints between the rails in the track, the vibration is liable to cause such relative movement between the piston head, and the ring and wall of the piston bore as to undesirably create hammer-like blows between the piston head and the wall of the bore. In time these blows may result in a groove being formed in the wall of the bore at either side of the ring where the piston head comes in contact with said wall. If the piston head is arranged with its axis horizontal, such grooves may be formed in the cylinder wall only in one side or portion of the wall, but if its axis is vertical, the groove may be annular in form around the whole wall. In devices such as triple valves employed on railway vehicles, this grooving of the piston cylinder wall is most likely to occur in the brake release position of the piston since the piston occupies this position the major portion of the time that a vehicle is in use.

This grooving is of course very objectionable particularly in air brake devices because it tends to create or increase leakage of fluid under pressure from one side of the piston to the other and thereby reduce the sensitivity of the piston to a variation of fluid pressure on one face and in case the leakage becomes sufficient it might even result in failure of the piston to respond to a normal variation in fluid pressure. Moreover, the piston head or ring is liable to catch on a side of the grooves and thus require a greater than normal reduction in pressure on the piston to start the piston moving out of its release position. Then when it starts moving, it might jump or over-travel a desired position and cause an undesired operation.

One object of the invention is therefore the provision of means for avoiding the above difficulty.

Another object of the invention is the provision of means for supporting a piston head against radial movement relative to the bore in which it operates so as to thereby prevent hammering of the piston head against the side wall of the bore.

In air brake devices a piston bore is usually provided in a casing section which is secured by bolts or the like to a cover member which closes one end of the bore. A gasket is inserted between the casing section and cover member for preventing leakage of fluid under pressure through the joint and this gasket extends inwardly past the joint for engagement by the piston in its application position to prevent leakage of fluid under pressure past the piston which might result in a release of brakes.

Another object of the invention is the provision of means associated with the gasket structure employed between the casing section and cover member of an air brake device for supporting a piston head in the casing section against radial movement relative to the wall of the piston bore in order to avoid the difficulty above described.

Another object of the invention is the provision of means for accomplishing the above result which does not require any modification or change in any operating part of an air brake device such as the AB valve device.

According to the last object the benefit of use of the invention may be obtained in a device like the AB valve device by the mere substitution of a gasket structure for that already in use, or by the addition of a gasket structure to the gasket in use and further, by the application of a screw-threaded member to a screw-threaded bore which exists in the brake pipe face of pistons such as used in the AB valve device.

Figure 2:
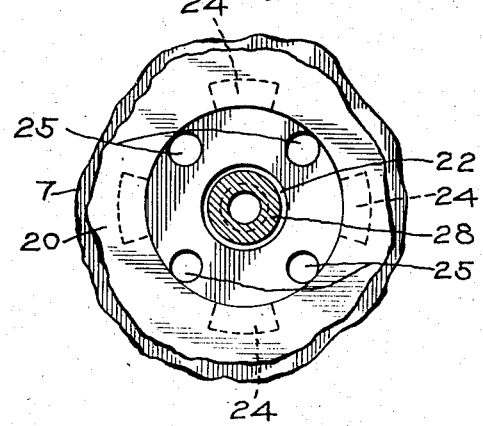
Figure 3:
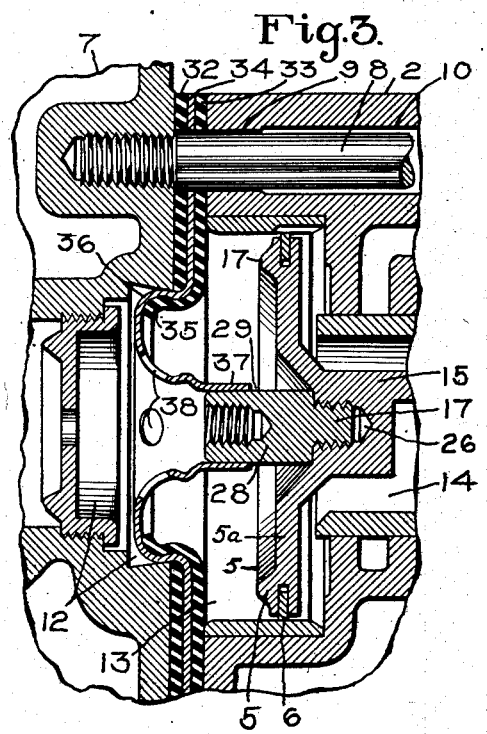
Figure 4:
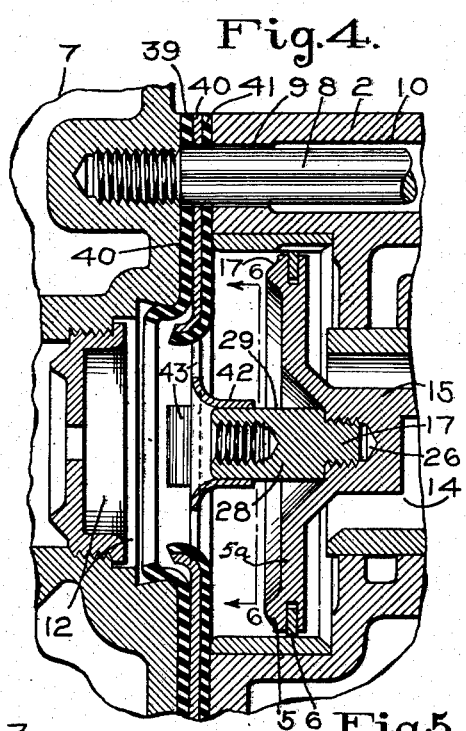
Figure 6:
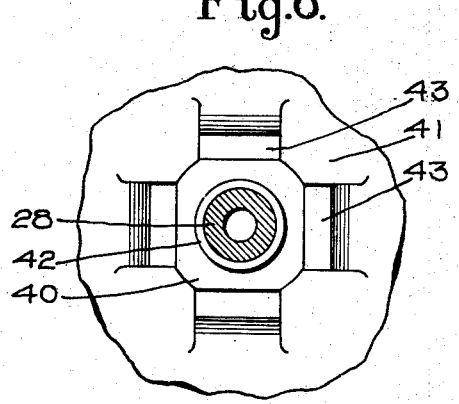
Figure 5:
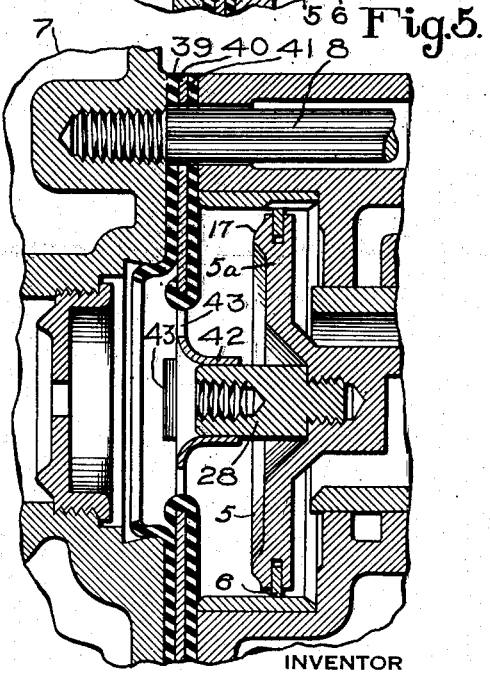

Other objects and advantages will be apparent from the following more detailed description of the invention;

In the accompanying drawings; Fig. 1 is a sectional view of a portion of a fluid pressure brake device embodying one form of the invention; Fig. 2 is a sectional view taken on the line 2—2 in Fig. 1; Figs. 3 to 5 are sectional views of a portion of the valve device shown in Fig. 1 embodying different forms of the invention; and Fig. 6 is a sectional view taken on the line 6—6 in Fig. 4.

General description

The several embodiments of the invention are shown in the drawings associated with a portion of a brake controlling valve device 1, which for the purpose of illustration may be of the well known AB type disclosed in Patent 2,031,213, issued to Clyde C. Farmer on February 18, 1936. Only such parts of the AB valve device which are pertinent to the invention are, however, shown in the drawings and the following description of such parts will also be limited to only that deemed essential to a clear and comprehensive understanding of the invention.

As shown in the drawings, the brake controlling valve device 1 comprises a casing 2 having at one end a bore 3 which is lined with a bushing 4 having in turn a bore in which is slidably mounted a piston 5. The piston 5 comprises a piston head 5a of a diameter slightly less than that of the bore in bushing 4, as shown somewhat exaggerated in the drawings, and the piston head is provided around its periphery with a groove in which is mounted a ring 6 expanded into contact with the wall of said bore, the ring being provided to prevent leakage of fluid under pressure from one side of the piston to the opposite side.

The bore in bushing 4 is open at one end of the casing 2 and this open end is closed by a cover 7 which is secured to the casing 2 by a plurality of studs 8, only one of which is shown in the drawings. One end of stud 8 is secured by screw-threaded engagement in the cover member 7 and extends through a bore 9 and an aligned and larger bore 10 in the casing 2 to beyond the outer face thereof where a nut 8a is provided on the opposite end of the stud and is pulled up against the casing to secure these two parts together. The bore 9 in casing 2 may be only slightly larger than the diameter of the stud 8 in order that the several studs may, with a desired degree of accuracy, position the casing 2 with respect to the cover member 7.

In the AB valve device disclosed in the patent above referred to, the cover member 7 constitutes a pipe bracket for supporting the casing 2 and through this pipe bracket, by way of an air strainer device 11 and cavities 12, communication is established between the usual brake pipe (not shown) on a vehicle and a chamber 13 provided between the piston 5 and cover member 7. At the opposite side of the piston 5 is a valve chamber 14 and the piston 5 has a stem 15 extending through this chamber into a bore in a cover member 16 wherein the end of the stem is supported and arranged to slide upon reciprocation of piston 5.

In the drawings the piston 5 is shown in its brake release position which it occupies the major portion of the time a railway vehicle is in use. The piston 5 is arranged to move from this position its full traverse in the direction of cover member 7 upon a reduction in pressure in the brake pipe and thereby in piston chamber 13 in order to effect an application of brakes. The piston 5 is provided with an annular rib 17 arranged upon such movement to seal against a gasket to prevent leakage of brake applying fluid from the valve chamber 14 past the piston to the brake pipe chamber 13. This gasket, which also extends and is clamped between the casing 2 and cover member 7 for preventing leakage of fluid under pressure through this joint, constitutes a portion of the subject matter of the invention, which will now be described.

Description—Figures 1 and 2

In this embodiment of the invention the reference numeral 20 indicates the gasket or gasket structure which extends from the exterior of the joint between the casing 2 and cover member 7 inwardly past the sealing rib 17 on the piston 5. This gasket is preferably made of a rubber composition moulded on and preferably bounded to the opposite sides of a circular plate 21 which extends outwardly past the portion of the gasket through which the studs 8 extend. The plate 21 is therefore provided with openings aligned with openings through the rubber composition on the opposite sides of the plate for mounting the gasket on studs 8. These openings through plate 21 are only slightly larger than the studs 8 in order that the studs may accurately locate the gasket. When the nuts 8a are drawn home, the gasket 20 is rigidly clamped in position and the rubber composition on opposite sides of plate 21 seals the joint with the casing 2 and cover member 7 against leakage.

The central portion of the plate 21 is provided, as by extrusion in the direction of piston 5, with a guide or support sleeve 22 extending into chamber 13 in the direction of piston 5. The fit between the studs 8 and the plate 21 in gasket 20 is such as to locate this sleeve in substantial concentric relation with the piston bore in bushing 4.

Between the sleeve 22 and the portion of gasket 20 arranged for engagement by the piston rib 17, the plate 21 is provided with a plurality of openings 24 through which, in the process of manufacture of the gasket, rubber composition is forced and moulded to that on the opposite sides of plate 21 to further secure the rubber composition to the plate. The rubber composition terminates on the plate at the inner edge of the openings 24 and between this edge of the openings 24 and the sleeve 22 the plate has a plurality of openings 25 providing a constantly open communication between the piston chamber 13 at one side of the gasket and the brake pipe cavities 12 at the opposite side of the gasket.

The piston head 5a has at its axis and in the face open to the brake pipe chamber 13 a screw-threaded bore 26 which is used for mounting the piston head for machining in the process of manufacture. According to the invention, the surface of piston head 5a immediately surrounding the open end of the bore 26 is accurately machined at right angles to the axis of the piston head and in this bore is mounted a stud portion 27 of a cylindrical piston support member 28 having a shoulder adjacent the stud portion also accurately formed at right angles to the axis of said member for engaging the surface around the bore 26. The support member 28 is thus rigidly secured to the piston head 5a and its outer cylindrical surface 29 is accurately positioned in coaxial relation with the piston head.

The support member 29 extends into the sleeve 22 projecting from the gasket plate 21 and has a neat sliding fit therein. With the sleeve 22 arranged in coaxial relation with the bore in piston bushing 4 and the support member 28 arranged in like relation to the piston head 5a, it will therefore be seen that the sleeve 22 and support member 29 will support the piston head 5a against radial movement relative to bushing 4 and thereby maintain the piston head in substantial concentric relation with the bushing 4. This structure will therefore prevent hammering between the piston head and the wall of the bore in said bushing 4 due to vibration, such as above described. To accomplish this result it is not however necessary to obtain exact concentricity between the piston head and bushing 4 since as long as the sleeve 22 and support member 29 hold the piston head against radial movement relative to the bore in bushing 4 the same desirable result will be obtained, as will be apparent.

In use, it will be seen that the support member 29 will slide in the sleeve 22 upon movement of the piston 5 in the bushing 4 so that at no time will the piston head be able to vibrate against said bushing. It should also be noted that the piston head 5a is not only supported at one end by sleeve 22 but is also supported at the opposite end by the end of the piston stem 15 in sliding engagement with the cover 16, whereby the piston head 5a and guide 29 therefore will be maintained in accurate operating alignment with the sleeve 22.

Description—Figure 3

According to this embodiment of the invention I employ between the casing 1 and cover member 7 a gasket structure comprising two separate or independent gaskets 32 and 33 preferably of rubber composition and arranged one at either side of a central metal plate 34, both of said gaskets and the plate extending to the outer periphery of the casing and having aligned bores through which the studs 8 extend for supporting the metal plate 34 and gaskets. The fit between the studs and bores in the plate 34 is such as to accurately position the plate in a desired relation to the cover member 7.

The gasket 32 preferably terminates at the inner edge of cavity 12 while the gasket 33 is preferably of the type in use in AB valve devices which has an inner annular flange 35 arranged to extend into the cavity 12. The metal plate 34 is provided with an annular flange portion 36 which fits around the outer contour of flange 35 on the gasket 33 and extends past the inner edge of the gasket flange 35 where it is connected with a sleeve 37 which is drawn from the plate in the direction of piston 5 and which projects into chamber 13. This sleeve 37 is arranged centrally of the metal plate 34 so as to be disposed in substantial concentric relation to the bore in bushing 4 when the casing 2 is mounted on the studs 8. The sleeve 37 is arranged to receive the piston support member 28 which has a sliding fit within the sleeve 37 for supporting the piston head 5a in substantial concentric relation with the bushing 4 and against radial movement relative to said bushing in order to avoid the difficulty above described. Back of the sleeve 37 the plate 34 is provided with a plurality of openings 38 establishing communication between the piston chamber 13 and the brake pipe cavities 12 in order that the piston 5 may be controlled in the usual manner from the brake pipe.

Description—Figures 4 and 6

According to this embodiment of the invention I employ a gasket structure comprising a composition gasket 39 arranged against the cover member 7. The gasket 39 may be the same type as used in the AB valve device and therefore like the gasket 33 shown in Fig. 3. With the gasket 39 in place I mount over the studs 8 a structure comprising a metal plate 40 having one face arranged to engage said gasket and to the opposite face of which is secured, preferably by bonding, a composition gasket 41 for sealing contact with casing 2 and the rib 17 on piston 5. The plate 40 is provided centrally with a sleeve 42 extending into piston chamber 13 in coaxial relation with the bore in bushing 4 when the casing 2 is mounted on the studs 8. The support member 28 projecting from the piston head 5a has sliding contact within the sleeve 42 which is thus arranged to support the piston head in substantial concentric relation with the bore in bushing 4 and to prevent radial movement of the piston head relative to and into contact with said bore and thereby the difficulties hereinbefore described.

Around the sleeve 42 the plate 40 is provided with a plurality of openings 43 connecting the piston chamber 13 to cavities 12 in the cover member 7 and thereby to the brake pipe. Each of these openings is made by cutting through the plate on three sides of a square or similar form and bending the part between the cuts outwardly of the plate in the direction of the cover member 7. Sections of the gasket 41 are moulded or bonded to these bent parts of the metal plate 40 for securely anchoring the central part of said gasket to said plate.

Description—Figure 5

This embodiment of the invention differs from that shown in Fig. 4 only in that the metal parts struck from plate 40 to form openings 43 are completely removed from the plate and the gasket 41 is moulded through said openings and around their outer edges on to the opposite side of the plate in order to better secure the inner edge of the gasket to the plate.

Summary

From the above description it will now be noted that I have provided means for supporting a piston head in substantial concentric relation with the bore in which it operates and to thereby prevent radial movement between the piston head and the wall of the bore due to vibration or the like, with the undesirable results above described. The supporting means comprises a rigid element associated with the piston head and support means for said element and piston head associated with the gasket structure interposed between the casing and cover of the valve device. The studs securing the casing and cover together act to centralize the support means associated with the gasket structure with respect to the bore in which the piston operates and with the rigid element associated with and accurately positioned axially of the piston head, the cooperation of said support means and said element accomplishing the desired result.

Of particular importance is the fact that any one of the several embodiments of the invention is capable of application to the well known AB valve device without any change thereof except in the gasket structure. The embodiments shown in Figs. 3 to 6 make use of the gasket already associated with the service and emergency portions of the AB valve device so that only the metal plate and gasket element for one side of the plate is required with these structures for accomplishing the desired end. The structures shown in Figs. 4 and 5 are, however, particularly useful in the application of the invention to the AB valve device in that it is only necessary to remove the casing 2 from the studs 8 leaving the gasket element 39 in place. The metal plate 40 and gasket 41 may be then mounted over the studs and the casing 2 replaced after securing the element 28 to the piston 5. To apply the structure shown in Fig. 3 to an AB valve device necessitates that the gasket 33 already used with the device be first removed to permit application of the structure including gasket 32 and plate 34 following which the gasket 33 will be mounted on studs 8. The use of gasket 29 shown in Fig. 1 does not require the use of an additional gasket such as 33 or 40 shown in Figs. 3 to 5.

Having now described my invention, what I claim as new and desire to secure by Letters Patent, is:

1. In combination, a casing having a piston bore open at one end, a cover closing the open end of said bore, bolt means rigidly securing said cover and casing together, cylindrical guide means independent of said casing and cover and supported on said bolt means in substantial coaxial relation with said bore, a piston head of smaller diameter than said bore mounted to reciprocate therein, and a piston head support member rigidly associated with said piston head in coaxial relation therewith and having sliding engagement with said guide means for supporting said piston head in substantial concentric relation with said bore.

2. In combination, a casing having a piston bore open at one end, a cover closing the open end of said bore, bolt means rigidly securing said cover and casing together, an element separate from said casing and cover and having a cylindrical support member disposed in said bore and carried by said bolt means in substantial coaxial relation with said bore, said element being clamped between said casing and cover by said bolt means, a piston head of smaller diameter than said bore mounted to reciprocate therein, a cylindrical support member rigidly associated with said piston head in coaxial relation therewith, one of said support members comprising a sleeve and the other a plunger having sliding contact with said sleeve for supporting said piston head in substantial concentric relation with said bore and providing for reciprocation of said piston head in said bore.

3. In combination, a casing having a piston bore open at one end, a cover secured to said casing over said one end of said bore, a gasket member clamped between said cover and casing and having a supporting surface disposed in said bore and arranged parallel to the axis of said bore, a piston head of smaller diameter than said bore disposed to reciprocate therein, a support rigidly connected with said piston head and having a surface arranged parallel to the axis of said piston, said surfaces being in sliding contact with each other and so arranged as to cooperate for supporting said piston head in substantial concentric relation with said bore.

4. In combination, a casing having a piston bore open at one end, a cover secured to said casing over said one end of said bore, a gasket member clamped between said cover and casing and having a supporting surface arranged parallel to the axis of said bore, a piston head of smaller diameter than said bore disposed to reciprocate therein, a support rigidly connected with one side of said piston head and having a surface arranged parallel to the axis of said piston head, a stem projecting from the opposite side of said piston head, means supporting the end of said stem, said surfaces being in sliding contact with each other and cooperative with the piston stem supporting means for holding said piston head in concentric relation with said bore.

5. In combination, a casing having a piston bore open at one end and having a valve chamber open at one end to the opposite end of said bore, a piston head of smaller diameter than said bore mounted to reciprocate therein, a stem projecting from said piston head through said valve chamber and having on its end a cylindrical guide, means associated with the opposite end of said valve chamber having a bore in coaxial relation with said piston bore in which the cylindrical end of said stem is mounted to slide, a cover closing the open end of said piston bore, bolt means securing said cover member and casing together, means clamped between said casing and cover member and having within said piston bore a cylindrical guide arranged in coaxial relation to said bore, and a cylindrical member rigidly secured to said piston head in coaxial relation therewith and having sliding contact with said guide and cooperative with the supported end of said piston stem to hold said piston head in substantial concentric relation with said piston bore.

6. In combination, a casing having a piston bore open at one end, a piston head of smaller diameter than said bore disposed to reciprocate therein, a support member rigidly secured to said piston head in coaxial relation therewith and projecting therefrom in the direction of the open end of said bore, cover means mounted over the open end of said bore, a gasket structure interposed between said cover means and casing, and bolt means securing said casing and cover member against the opposite faces of said gasket structure and extending through said gasket structure supporting same, said gasket structure comprising resilient parts for sealing engagement with said casing and cover and an intermediate rigid part extending into said bore over the open end thereof and having a support member in sliding contact with the piston head support member axially of said piston head for supporting said piston head in coaxial relation with said bore.

7. In combination, a casing having a piston bore open at one end, a piston head of smaller diameter than said bore disposed to reciprocate therein, a support member rigidly secured to said piston head in coaxial relation therewith and projecting therefrom in the direction of the open end of said bore, a cover means mounted over the open end of said bore, a gasket structure interposed between said cover means and casing, and bolt means securing said casing and cover member against the opposite faces of said gasket structure and extending through said gasket structure supporting same, said gasket structure comprising resilient parts for sealing engagement with said casing and cover and a rigid intermediate part extending into said bore over the open end thereof and having a cylindrical sleeve arranged in coaxial relation with said bore, the piston support member being cylindrical in form and having a sliding fit in said sleeve for supporting said piston head in substantial concentric relation with said bore.

8. In combination, a casing having a piston bore open at one end, a piston head of smaller diameter than said bore disposed to reciprocate therein, a support member rigidly secured to said piston head in coaxial relation therewith and projecting therefrom in the direction of the open end of said bore, cover means mounted over the open end of said bore, a gasket structure interposed between said cover means and casing, and bolt means securing said casing and cover member against the opposite faces of said gasket structure and extending through said gasket structure supporting same, said gasket structure comprising a central rigid metal part supported on said bolt means and extending into said piston bore over the open end thereof and therein having through openings, and resilient parts provided on the opposite surfaces of said rigid part and joined through said openings, said rigid part extending inwardly beyond said openings and being there provided with a cylindrical portion positioned by said bolt means in coaxial relation with said bore upon securing said casing and cover member together, said piston support member being cylindrical in form and in coaxial relation to said piston head and having a telescopic connection with said cylindrical portion for supporting said piston head in substantial concentric relation with said bore, said rigid part having openings adjacent said sleeve connecting the spaces at the opposite sides of said rigid part.

9. In combination, a casing having a piston bore open at one end, a piston head of smaller diameter than said bore disposed to reciprocate therein, a support member rigidly secured to said piston head in coaxial relation therewith and projecting therefrom in the direction of the open end of said bore, cover means mounted over the open end of said bore, a gasket structure interposed between said cover means and casing, and bolt means securing said casing and cover member against the opposite faces of said gasket structure and extending through said gasket structure supporting same, said gasket structure comprising a central rigid metal part supported on said bolt means, a resilient part bonded to one side of said metal part, a resilient part separate from and arranged to be engaged by the opposite side of said metal part, said resilient parts being provided for sealing engagement with said cover and casing and extending over a portion at least of the open end of said bore to provide for sealing engagement of said piston head with the adjacent resilient part, said rigid part extending inwardly over the open end of said bore beyond said resilient parts and being provided centrally with a cylindrical portion arranged to be disposed in coaxial relation with said bore by said bolt means upon securing said casing and cover means together by said bolt means, said piston support having a telescopic connection with said cylindrical portion in a direction parallel to the axis of said piston head for supporting said piston head in substantial concentric relation with said bore.

10. In combination, a casing having a piston bore open at one end, a piston head of smaller diameter than said bore disposed to reciprocate therein, a cylindrical support member rigidly secured to said piston head in coaxial relation therewith and projecting therefrom in the direction of the open end of said bore, a cover closing the open end of said bore and having a cavity open at one end to the open end of said bore, a gasket structure interposed between said cover and casing, means having one end secured to said cover and extending through aligned openings in said gasket structure and casing for supporting said gasket structure and for securing said cover and casing together against opposite faces of said gasket structure, said gasket structure comprising two resilient members one for sealing engagement with said cover and the other for sealing engagement with said casing and a central metal part bonded to the resilient member engaging the casing but not to the other resilient member, said resilient members and metal part extending into said bore along the open end thereof to provide for sealing contact of said piston head with the resilient member adjacent thereto, and said metal part extending inwardly past said resilient members and being provided centrally with a cylindrical portion arranged to be supported by said bolt means in coaxial relation with said bore with said casing secured to said cover, said support member having sliding engagement with said cylindrical portion for supporting said piston head in concentric relation with said bore, said metal part adjacent said cylindrical portion also having an opening providing for air flow between the opposite side of said metal part.

11. In combination, a casing having a piston bore open at one end, a piston head of smaller diameter than said bore disposed to reciprocate therein, a cylindrical support member rigidly secured to said piston head in coaxial relation therewith and projecting therefrom in the direction of the open end of said bore, a cover closing the open end of said bore and having a cavity open at one end to the open end of said bore, a gasket structure interposed between said cover and casing, bolt means having one end secured to said cover and extending through aligned openings in said gasket structure and casing for supporting said gasket structure and for securing said cover and casing together against opposite faces of said gasket structure, said gasket structure comprising two resilient members one for sealing engagement with said cover and the other for sealing engagement with said casing and a central metal part bonded to the resilient member engaging the casing but not to the other resilient member, said resilient members and metal part extending into said bore along the open end thereof to provide for sealing contact of said piston with the resilient member adjacent thereto, and said metal part extending inwardly past said resilient members and being provided centrally with a cylindrical portion arranged to be supported by said bolt means in coaxial relation with said bore with said casing secured to said cover, said support member having sliding engagement with said cylindrical portion for supporting said piston head in concentric relation with said bore, said metal part adjacent said cylindrical portion also having an opening providing for air flow between the opposite sides of said metal part, said resilient member engaging said cover being a service or emergency piston cover gasket of an AB valve device and having centrally an outturned annular flange disposed in said cavity.

12. In combination, a casing having a piston bore open at one end, a piston head of smaller diameter than said bore disposed to reciprocate therein, a cylindrical support member rigidly secured to said piston head in coaxial relation therewith and projecting therefrom in the direction of the open end of said bore, a cover closing the open end of said bore and having a cavity open at one end to the open end of said bore, a gasket structure interposed between said cover and casing, means having one end secured to said cover and extending through aligned openings in said gasket structure and casing for supporting said gasket structure and for securing said cover and casing together against opposite faces of said gasket structure, said gasket structure comprising two resilient members one for sealing engagement with said cover and the other for sealing engagement with said casing and a central metal part bonded to the resilient member engaging the casing but not to the other resilient member, said resilient members and metal part extending into said bore along the open end thereof to provide for sealing contact of said piston with the resilient member adjacent thereto, and said metal part extending inwardly past said resilient members and being provided centrally with a cylindrical portion arranged to be supported by said bolt means in coaxial relation with said bore with said casing secured to said cover, said support member having sliding engagement with said cylindrical portion for supporting said piston head in concentric relation with said bore, said resilient member engaging said cover being a service or an emergency piston cover gasket of an AB valve device having centrally an outturned annular flange for disposition in said cavity, said metal part and the resilient member engaging said casing extending through the open end of said bore beyond said annular flange, said metal part having adjacent said cylindrical portion openings providing for air flow between the opposite sides of said gasket, and the resilient member engaging said casing having parts extending through said openings and bonded to the opposite sides of said metal part.

JOHN N. GOOD.